(12) United States Patent
Yamada et al.

(10) Patent No.: US 6,741,058 B2
(45) Date of Patent: May 25, 2004

(54) DRIVE UNIT FOR INITIALIZATION

(75) Inventors: Yoshihisa Yamada, Shizuoka (JP); Hidemasa Umehara, Shizuoka (JP); Yoshiyuki Muramatsu, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/270,718

(22) Filed: Oct. 16, 2002

(65) Prior Publication Data

US 2003/0076069 A1 Apr. 24, 2003

(30) Foreign Application Priority Data

Oct. 17, 2001 (JP) ........................................ 2001-319443

(51) Int. Cl.$^7$ .............................................. G05B 19/40
(52) U.S. Cl. ........................ 318/685; 318/696; 324/163; 324/164; 73/1.37; 73/1.88
(58) Field of Search ................................. 318/685, 696; 324/163, 164; 73/1.88, 1.37

(56) References Cited

U.S. PATENT DOCUMENTS 5,032,781 A * 7/1991 Kronenberg ................. 318/696
5,723,964 A * 3/1998 Nakaba ....................... 318/599
5,877,694 A * 3/1999 Kataoka ...................... 340/688
6,014,075 A * 1/2000 Fujimori et al. ............. 340/461
6,519,999 B2 * 2/2003 Komura et al. .............. 73/1.88

* cited by examiner

Primary Examiner—Rina Duda
(74) Attorney, Agent, or Firm—Armstrong, Kratz, Quintos, Hanson & Brooks, LLP

(57) ABSTRACT

A drive unit for calibrating an indicator/meter of a vehicle is provided in which a pointer in an indicator for a vehicle can point immediately after an ignition switch is turned ON, and the frequency of seeing motion of the pointer in an initializing operation by a car driver is reduced. A sensing mechanism (8a-3) is provided to sense an open/close operation of a door. Correspondingly to the sensing of the sensing mechanism (8a-3), a drive-start mechanism (8a-4) starts rotation of a stepping motor using a drive mechanism (8a-1) for initialization. The drive mechanism (8a-1) during initialization rotates the stepping motor to move a driven member toward a stopper.

6 Claims, 2 Drawing Sheets

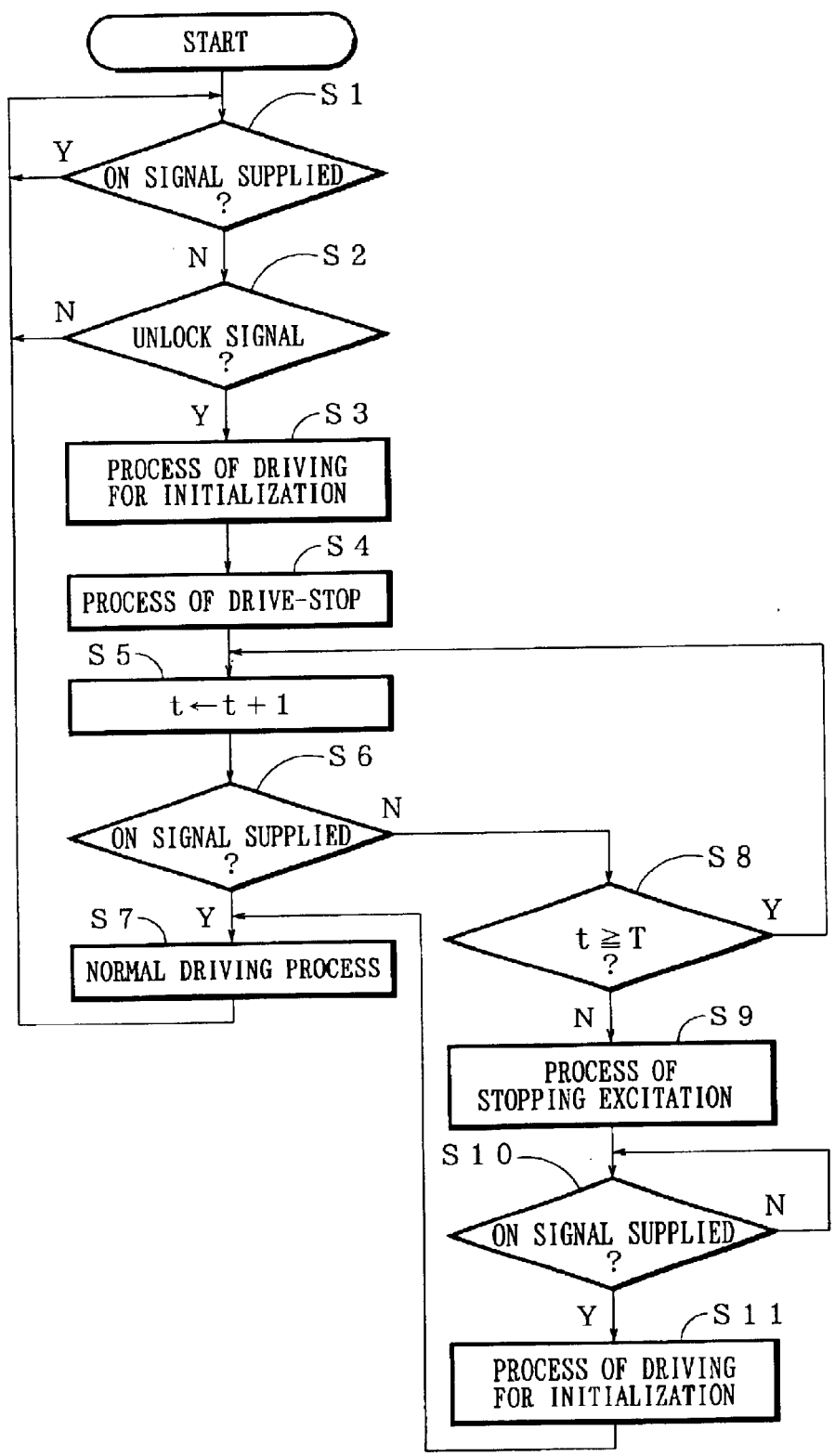

DRIVE UNIT FOR INITIALIZATION

BACKGROUND OF THE INVENTION

1. Field of the Invention

This invention relates to a drive unit for initialization, especially to a drive unit for initialization to reset a condition of step-out of a stepping motor for driving a pointer mounted in an indicator of a vehicle.

2. Description of the Related Art

An indicator shown in FIG. 1 exists usually as an indicator for a vehicle by a stepping motor. In FIG. 1, the indicator includes a stepping motor 1, a pointer 2 interlocking rotation of the stepping motor 1 and a drive unit 8 for stepping motor (call a drive unit 8 simply hereafter) for rotating normally and reversely the stepping motor 1. The stepping motor 1, as mentioned above, includes two exciting coils 1a1 and 1a2, a rotor 1b being magnetized each three poles alternately N pole and S pole and rotating to follow the change of excited conditions of the exciting coils 1a1 and 1a2, and a gear 1d transmitting a driving force of the rotor 1b to the pointer 2.

The stepping motor 1, which is mounted on the back side against the gear id at the same side of the pointer 2, includes a piece 1e as a driven member interlocking rotation of the rotor 1b; a not-shown receiving case for receiving the exciting coils 1a1 and 1a2, the rotor 1b, the gear 1d and the piece 1e; and a stopper 1f being mounted at the receiving case and stopping mechanically rotation of the rotor 1b to abut on the piece 1e.

Reverse rotation is defined by rotating the stepping motor 1 to move the piece 1e toward the stopper 1f. A direction of reverse rotation Y 1 is defined by a direction of rotation of the pointer 2 in reverse rotation. Oppositely, normal rotation is defined by rotating the stepping motor 1 to move the piece le apart from the stopper 1f and a direction of normal rotation Y 2 is defined by a direction of rotation of the pointer 2 in normal rotation. The stopper 1f is located to make the pointer 2 point a scale reading of 0 Km/h on a scale plate when the stopper if abuts on the piece 1e.

When above indicator is used for a car speedometer, the drive unit 8 rotates the rotor 1b correspondingly to an amount of moving è–è' of a difference of a target position è and a current position è' of the pointer 2 to make the pointer 2 move the difference of è–è' for pointing the target position è. The target position è is renewed by an angle datum èi whenever the angle datum èi calculated with a speed datum by an output of a car speed sensor is inputted. The angle datum èi is calculated as reference angle zero degree at speed datum of zero Km/h and increased in proportion of increasing speed datum.

The indicator may have step-out, which is an phenomenon of difference of a required moving amount (difference of è–è') and an actual moving amount of the pointer 2, caused by vibration of a car or inputting of an angle datum with superposed noise. If the step-out is repeated, a speed pointed by the pointer 2 is different from a speed datum measured by the speed sensor so that the indicator cannot indicate accurately.

Therefore, for solving such trouble, a later-described initializing operation is acted by the drive unit 8. In the initializing operation, the drive unit 8 rotates reversely the stepping motor 1 to move the piece 1e toward the stopper 1f whenever an ignition switch is turned ON. Thereafter, the drive unit 8 stops electrically rotation of the stepping motor 1 to maintain exciting coils 1a1 and 1a2 in a predetermined initial excited condition when the piece 1e abuts on the stopper 1f and the pointer 2 stops mechanically at an abutting position as a scale reading of 0 Km/h on a scale plate. By acting the initializing operation as mentioned above, when the current position è' is sensed as 0 degree, the pointer 2 points at a scale reading of 0 Km/h as the abutting position. Thus, difference of the speed pointed by the pointer 2 and the speed datum measured by the speed sensor can be reset.

Objects to be Solved

The indicator as mentioned above is initialized at timing when the ignition switch is turned ON. Therefore, the usual indicator cannot indicate a measured value immediately after being activated correspondingly to turning the ignition switch ON. Especially, when the indicator is used for a tachometer, the indicator may not indicate a rotation speed of an engine for an initializing operation although the engine has started. It has been required that motion of the pointer in the initializing operation is hidden from a driver.

To solve such problems, it is considered that the initializing operation is acted at timing when the ignition switch is turned OFF. If time from the initializing operation to starting the indicator is required much, a car is vibrated during the time so that possibility of step-out is increased. Therefore, step-out may be occurred when starting the indicator and then the indicator cannot indicate accurately.

To overcome the above drawback of prior art, one object of this invention is to provide a drive unit for initialization, in which a pointer in an indicator for a vehicle can point immediately after an ignition switch is turned ON by starting the initializing operation correspondingly to an open/close operation of a door of a vehicle, and frequency of seeing motion of a pointer in the initializing operation by a car driver is reduced.

SUMMARY OF THE INVENTION

How to Attain the Object

In order to attain the objects, a drive unit for initialization according to this invention, which includes, as shown in FIG. 1 of a basic structure block diagram; drive means 8a-1 for initializing a stepping motor 1 to rotate for actuating a pointer mounted in an indicator of a vehicle so as to move a driven member, interlockingly with rotation of the stepping motor, toward a stopper for stopping the rotation of the stepping motor mechanically by abutting on the driven member; and drive-stop means 8a-2 for stopping the rotation of the stepping motor electrically after the driven member being abutted on the stopper, comprises sensing means 8a-3 for sensing an open/close operation of a door of the vehicle, and drive-start means 8a-4 for starting rotation of the stepping motor by the drive means for initialization correspondingly to an output of the sensing means when an ignition switch is in a state of OFF condition.

According to the above structure, the sensing means senses an open/close operation of a door of a vehicle. The drive-start means starts rotation of the stepping motor by the drive means for initialization correspondingly to an output of the sensing means when the ignition switch is in a state of OFF condition. The drive means for initialization rotates the stepping motor so as to move a driven member, interlockingly with rotation of the stepping motor for actuating a pointer in an indicator of a vehicle, toward a stopper for stopping the rotation of the stepping motor mechanically by abutting on the driven member. The drive-stop means stops the rotation of the stepping motor electrically after the driven member being abutted on the stopper.

A car driver turns the ignition switch ON to start the indicator for a vehicle usually after open and close a door to go into a car. Therefore, the initializing operation can be completed before the ignition switch is turned ON, by starting the operation by the drive means for initialization when the ignition switch is in a state of OFF condition and an open/close operation of a door is sensed.

Advantageously, the drive unit for initialization according to this invention, shown in FIG. 1 of a basic structure block diagram, is characterized by the fact that the sensing means senses an open/close operation of the door of the vehicle when a door-lock switch SW2 is turned ON or OFF to lock or unlock the door in the drive unit for initialization mentioned above.

According to the above structure, when the door-lock switch is turned ON or OFF to lock or unlock the door, the sensing means senses an open/close operation of a door. Therefore, a door-lock switch turning ON or OFF for locking or unlocking a door can be shared for sensing an open/close operation of a door.

Advantageously, the drive unit for initialization according to this invention, is characterized by the fact that the sensing means senses an open/close operation of the door when a courtesy switch is turned ON or OFF to switch a courtesy lamp ON or OFF correspondingly to open or close of the door in the drive unit for initialization mentioned above.

According to the above structure, when the courtesy switch is turned ON or OFF to switch the courtesy lamp ON or OFF correspondingly to open or close of the door, the sensing means senses an open/close operation of a door. Therefore, a courtesy switch turning ON or OFF for switching the courtesy lamp ON or OFF can be shared for sensing an open/close operation of a door.

Advantageously, the drive unit for initialization according to this invention, as shown in FIG. 1 of a basic structure block diagram, is characterized by the fact that the drive-stop means maintains exciting coils of the stepping motor in a predetermined excited condition until the ignition switch SW1 is turned ON to stop electrically the rotation of the stepping motor in the drive unit for initialization mentioned above.

According to the above structure, the drive-stop means maintains exciting coils of the stepping motor in a predetermined excited condition until the ignition switch SW1 is turned ON to stop electrically the rotation of the stepping motor. Therefore, even if the vehicle is vibrated until the ignition switch is turned ON, the pointer has no chance of step-out.

Advantageously, the drive unit for initialization is characterized by the fact that the drive-stop means maintains the exciting coils in a predetermined excited condition and stops the excitation of the exciting coils when the ignition switch is not turned ON after elapsing a predetermined time in the drive unit for initialization mentioned above.

According to the above structure, the drive-stop means stops the excitation of exciting coils when the ignition switch is not turned ON after elapsing a predetermined time for maintaining the exciting coils in the excitation. Therefore, when the ignition switch is not turned ON after elapsing a predetermined time from an open/close operation of the door, the excitation of the exciting coils is stopped so that the excitation of the exciting coils is not maintained for a long while an engine is not started and an alternator does not generate electricity.

Advantageously, the drive unit for initialization according to this invention, is characterized by the fact that the drive-start means starts rotation of the stepping motor by the drive means for initialization when the ignition switch is turned ON in the condition that excitation of the exciting coils is stopped by the drive-stop means in the drive unit for initialization mentioned above.

According to the above structure, the drive-start means starts rotation of the stepping motor by the drive means for initialization when the ignition switch is turned ON in the condition that excitation of the exciting coils is stopped by the drive-stop means. Therefore, when the ignition switch is turned ON in the condition that excitation of the exciting coils is stopped, the initializing operation is acted again so that the indicator is not driven in a condition of stopped excitation of the exciting coils, i.e. in a condition of step-out.

The above and other objects and features of this invention will become more apparent from the following description taken in conjunction with the accompanying drawings.

BRIEF DESCRIPTION OF THE DRAWINGS

FIG. 3 is a flowchart, showing processes of a CPU 8a structuring the indicator for a vehicle of FIG. 2.

DESCRIPTION OF THE PREFERRED EMBODIMENT

An embodiment according to this invention will now be described with reference to drawings.

Figure 1:
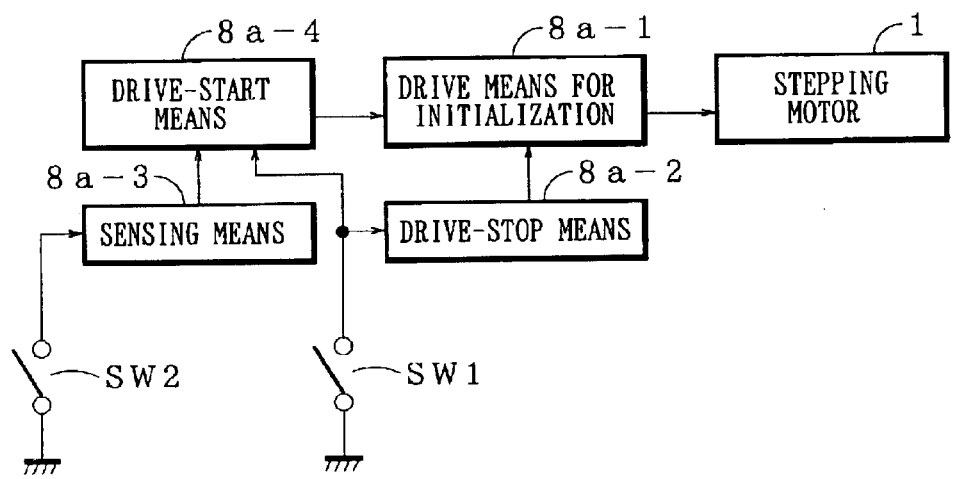
FIG. 1 is a basic structure block diagram of a drive unit for initialization according to this invention.
Figure 2:
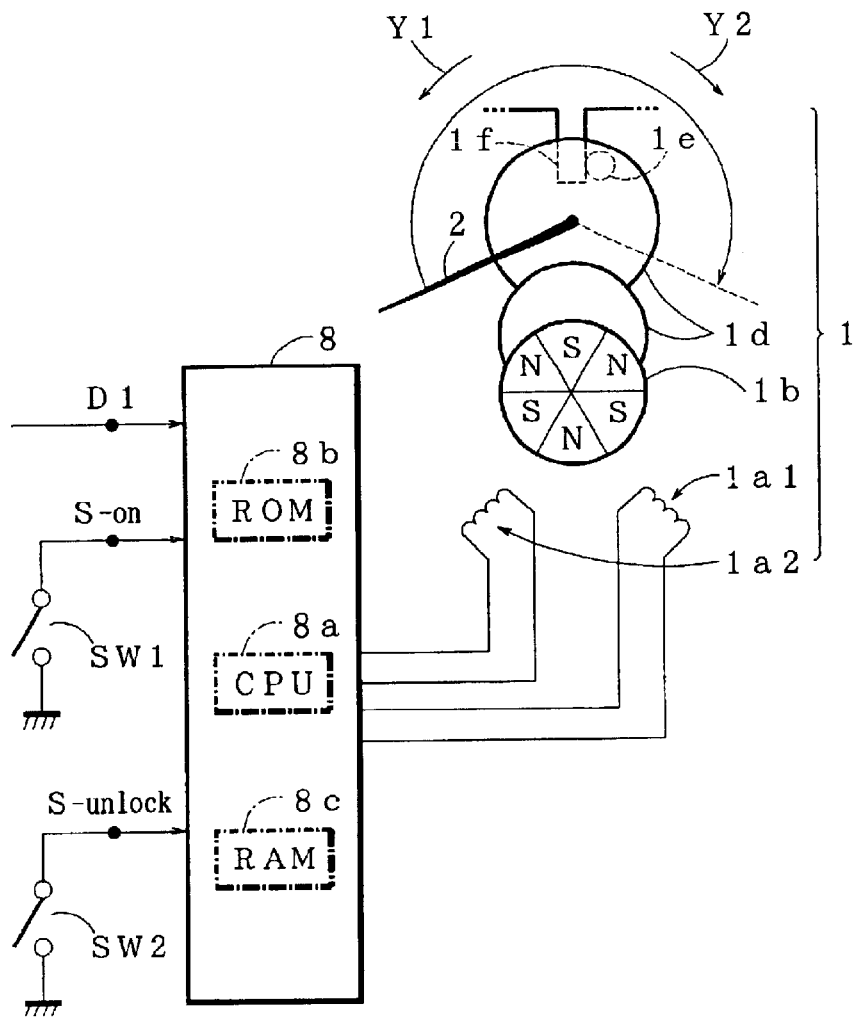
FIG. 2 is a drawing, showing an embodiment of an indicator for a vehicle having a drive unit for initialization according to this invention.

FIG. 2 shows an indicator for a vehicle which a drive unit for initialization according to this invention is installed in. As same as an usual indicator mentioned above, the indicator includes a stepping motor 1, a pointer 2 and a drive unit 8. The stepping motor 1 includes exciting coils 1a1 and 1a2, a rotor 1b, a gear 1d, a piece 1e (corresponding to a driven member in claims of this invention) and a stopper 1f as same as the usual indicator.

A reverse direction Y1 is defined by a direction of rotation of the pointer 2 on rotating the stepping motor 1 to move the piece 1e toward the stopper 1f. A normal direction Y2 is defined by a direction of rotation of the pointer 2 on rotating the stepping motor 1 to move the piece 1e apart from the stopper 1f in normal rotation. The stopper 1f is located to make the pointer 2 point a scale reading of zero on a scale plate when the piece 1e abuts thereon.

The exciting coils 11 and 1a2 in the stepping motor 1 are connected with the drive unit 8. Excited conditions of respective exciting coils 1a1 and 1a2 are changed by outputs of excitation data from the drive unit 8 to rotate the rotor 1b.

The drive unit 8 is connected with an ignition switch SW1 (call IG switch SW1 hereafter). When the IG switch SW1 is turned ON, ON signal S-on by logical H level is supplied to the drive unit 8. An angle datum D1 is also supplied to the drive unit 8. The angle datum D1 is corresponding to a measured value by a not-shown sensor. A door-lock switch-SW2 is also connected with the drive unit 8 to supply an Unlock signal S-unlock by logical H level to the drive unit 8.

The drive unit 8 includes a central processing unit (CPU) 8a for processing various operations by programmed control, a read only memory ROM 8b for storing a processing program to be acted by the CPU 8a, and a read/write memory RAM 8c with work area to be used in some processes of the CPU 8a and data storage area for storing various data. The CPU 8a, the ROM 8b and the RAM 8c are connected mutually by not-shown bus lines.

Operations of the indicator for a vehicle, in which the drive unit for initialization having above structure is installed, will be described as follows with reference to a flow chart in FIG. 3, showing a procedure of the CPU 8a.

The CPU 8a starts processes by turning a not-shown battery power source ON and initializes required area defined in the RAM 8c of the drive unit 8 at a not-shown initializing step.

When the IG switch SW1 is in a state of OFF condition and the ON signal S-on by logical H level is not supplied (step S1) if the door is unlocked by a driver and the Unlock signal S-unlock is supplied (step S2), the CPU 8a performs as sensing means and drive-start means to sense an open/close operation of the door and start a process of driving for initialization (step S3). In the process of driving for initialization, the CPU 8a performs as the drive means for initialization to rotate the rotor 1b by changing intermittently the excitation of the exciting coils 1a1 and 1a2 to move the piece 1e toward the stopper 1f. By the process of driving for initialization, the pointer 2 moves toward zero position.

Thereafter, when the piece 1e abuts on the stopper 1f and stopping mechanically rotation of the stepping motor 1 is judged, the CPU 8a performs as the drive-stop means to maintain the excitation of the exciting coils 1a1 and 1a2, and to act a process of drive-stop for maintaining predetermined excitation (step S4). By the process of driving stopping, rotation of the stepping motor is stopped electrically in a condition of the pointer 2 pointing zero.

Herein, the abutting may be judged by existence of induced voltage generated in a sensing coil mounted in the vicinity of the rotor 1b, for example. When induced voltage is generated in the sensing coil, the rotor 1b is rotating and it can be judged that the piece 1e does not abut on the stopper 1f. Oppositely, when induced voltage is not generated in the sensing coil, it can be judges that rotation of the rotor 1b is stopped mechanically by the piece 1e abutting on the stopper 1f.

In the embodiment of this invention, exciting coils 1a1 and 1a2, which are non-excited in the process of driving for initialization, are shared for the sensing coil and a position sensing circuit (not shown) for sensing abutting by existence of induced voltage generated in the non-excited exciting coils 1a1 and 1a2 is provided.

Thereafter, the CPU 8a adds an increment on a count value t of a predetermined time stored in the RAM 8c (step S5). Then, the CPU 8a judges existence of the ON signal S-on (step S6). If the ON signal S-on is supplied (Y in step S6), the CPU 8a judges that the IG switch SW1 is turned ON by a car driver and acts a normal driving process (step S7).

The normal driving process means a process to rotate the rotor 1b in a normal or reverse direction with an angle corresponding to an angle datum D1 by outputting an exciting signal corresponding to the angle datum D1 for changing excitation of the exciting coils 1a1 and 1a2. By the normal driving process, the pointer 2 points a measuring value. After that, when the IG switch SW1 is turned OFF and outputting the ON signal S-on is stopped, the CPU 8a finishes the normal driving process and returns the process to step S1.

On the other hand, when the ON signal S-on has not been supplied within a predetermined time T after completing the process of drive-stop in step S4 (N in step 8), the CPU 8a performs as the drive-stop means to stop excitation of the exciting coils 1a1 and 1a2 and act process of stopping excitation to non-excite the both exciting coils (step 9) Thereafter, when the ON signal S-on is supplied (Y in step 10) the CPU 8a acts the process of driving for initialization (step 11) and then proceeds the process to step 7.

Thus, after the process of stopping excitation, the process of driving for initialization is acted correspondingly to supplying the ON signal S-on so that the indicator is not driven in a condition of stopped excitation of the exciting coils, i.e. in a condition of step-out.

Generally, a car driver turns the IG switch SW1 ON to start the indicator after acting an open/close operation of the door. The open/close operation of the door means actions of unlocking the locked door, opening the door, riding in the car, closing the door and locking the door.

Watching the above actions, the indicator for a vehicle according to this invention acts processes of driving for initialization and drive-stop when the Unlock signal S-unlock is supplied and it is judged that an open/close operation of a door is acted. Therefore, just before the IG switch SW1 is turned ON, the processes of driving for initialization and drive-stop can be completed so that the pointer 2 can point a measured value immediately after the IG switch SW1 is turned ON and frequency of seeing motion of a pointer in an initializing operation by a car driver is reduced.

When the door-lock switch SW2 for unlocking a door is turned ON and an Unlock signal S-unlock is supplied, the open/close operation of a door of a vehicle is sensed in the above indicator for a vehicle. Thus, sharing the door-lock switch SW2 for sensing the open/close operation of a door, the structure is simplified and the cost can be reduced.

In the indicator for a vehicle mentioned above, maintaining the exciting coils 1a1 and 1a2 in a predetermined excitation in the step 4 of process of drive-stop, rotation of the stepping motor 1 is stopped electrically. Thereby, if a vehicle is vibrated until the IG switch SW1 is turned ON, the pointer 2 has no chance of step-out and can point a measured value accurately after the IG switch SW1 is turned ON.

Furthermore, in the indicator for a vehicle mentioned above, if the IG switch SW1 has not been turned ON within a predetermined time after maintaining the exciting coils 1a1 and 1a2 in a predetermined excitation in the step 4 of a process of drive-stop, the excitation of the exciting coils 1a1 and 1a2 is stopped. Thereby, the excitation of the exciting coils 1a1 and 1a2 is not maintained continuously in a condition that the IG switch SW1 is not in a state of ON condition, i.e. an alternator does not generate electricity, so that discharging of a battery can be prevented.

In the embodiment mentioned above, the open/close operation of a door is defined by supplying an unlock signal S-unlock. Preferably, an open/close operation of a door may be defined by supplying Lock signal S-lock from the door-lock switch SW2 correspondingly to a lock operation of the door.

Preferably, connecting a courtesy switch for turning a courtesy lamp ON/OFF correspondingly to door open/close with the drive means 8, the open/close operation of a door may be defined by the courtesy switch ON/OFF.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the (spirit or) scope of this invention as defined by the following claims.

What is claimed is:

1. A drive unit for calibrating an indicator/meter of a vehicle including drive means for initializing a stepping motor to rotate for actuating a pointer in an indicator of a vehicle so as to move a driven member, interlockingly with rotation of the stepping motor, toward a stopper for stopping the rotation of the stepping motor mechanically by abutting therewith, and drive-stop means for stopping the rotation of the stepping motor electrically after the driven member being abutted on the stopper, comprising:

sensing means for sensing an open/close operation of a door of the vehicle; and drive-start means for starting rotation of the stepping motor by said drive means for initialization, correspondingly to an output of the sensing means when an ignition switch is in a state of OFF condition.

2. The drive unit for calibrating an indicator/meter of a vehicle according to claim 1, wherein the sensing means senses an open/close operation of the door of the vehicle when a door-lock switch is turned ON or OFF to lock or unlock the door.

3. The drive unit for calibrating an indicator/meter of a vehicle according to claim 1, wherein the sensing means senses an open/close operation of the door when a courtesy switch is turned ON or OFF to switch a courtesy lamp ON or OFF correspondingly to the operation of open or close of the door.

4. The drive unit for calibrating an indicator/meter of a vehicle according to claim 1, 2 or 3, wherein the drive-stop means maintains exciting coils of the stepping motor in a predetermined excited condition until the ignition switch is turned ON to stop electrically the rotation of the stepping motor.

5. The drive unit for calibrating an indicator/meter of a vehicle according to claim 4, wherein the drive-stop means maintains the exciting coils in a predetermined excited condition and stops the excitation of the exciting coils when the ignition switch is not turned ON after elapsing a predetermined time.

6. The drive unit for calibrating an indicator/meter of a vehicle according to claim 5, wherein the drive-start means starts rotation of the stepping motor by the drive means for initialization when the ignition switch is turned ON in the condition that excitation of the exciting coils is stopped by the drive-stop means.

* * * * *